United States Patent [19]

Kleimola

[11] Patent Number: 4,473,528
[45] Date of Patent: Sep. 25, 1984

[54] PASSIVE CONTAINMENT SYSTEM

[75] Inventor: Frank W. Kleimola, Jackson, Mich.

[73] Assignee: Nucledyne Engineering Corporation, Jackson, Mich.

[21] Appl. No.: 142,425

[22] Filed: Apr. 21, 1980

[51] Int. Cl.³ .............................................. G21C 15/18
[52] U.S. Cl. .................................... 376/282; 376/283; 376/299; 376/307; 376/292
[58] Field of Search .............................. 176/37, 38, 65; 376/282, 283, 284, 292, 307, 316, 298, 299

[56] References Cited

U.S. PATENT DOCUMENTS

| | | | |
|---|---|---|---|
| 3,115,450 | 12/1963 | Schanz | 176/37 |
| 3,211,621 | 10/1965 | Creagan | 376/282 |
| 3,454,466 | 7/1969 | Pitt et al. | 376/283 |
| 3,607,635 | 9/1971 | Ripley | 176/65 |
| 3,718,539 | 2/1973 | West et al. | 176/37 |
| 3,859,166 | 1/1975 | Flynn et al. | 376/282 |
| 3,865,688 | 2/1975 | Kleimola | 176/37 |
| 3,929,567 | 12/1975 | Schabert et al. | 376/282 |
| 3,984,282 | 10/1976 | Kleimola | 176/37 |
| 4,022,655 | 5/1977 | Gaouditz et al. | 376/283 |
| 4,050,983 | 9/1977 | Kleimola | 176/37 |
| 4,051,892 | 10/1977 | Reinsch | 176/37 |
| 4,086,308 | 4/1978 | Jürgens et al. | 176/37 |
| 4,157,939 | 6/1979 | Schabert et al. | 376/282 |
| 4,158,603 | 6/1979 | Kuhnel | 376/283 |
| 4,213,824 | 7/1980 | Jabsen | 376/283 |
| 4,239,596 | 12/1980 | Bevilaqua et al. | 176/37 |
| 4,252,611 | 2/1981 | Mizumachi | 176/37 |
| 4,278,500 | 7/1981 | Ailloud et al. | 376/282 |
| 4,280,796 | 7/1981 | Reinsch | 376/282 |

FOREIGN PATENT DOCUMENTS

| | | | |
|---|---|---|---|
| 2304700 | 8/1974 | Fed. Rep. of Germany | 376/282 |
| 2615492 | 11/1976 | Fed. Rep. of Germany | 176/37 |
| 2719897 | 12/1977 | Fed. Rep. of Germany | 176/37 |

OTHER PUBLICATIONS

Strauss, Nuclear Power Plant Safety, Power (Jan. 1968) pp. 159-166.
Nuclear Safety, vol. 23, No. 2, 1982, pp. 127-145.

Primary Examiner—Harvey E. Behrend
Attorney, Agent, or Firm—Beaman & Beaman

[57] ABSTRACT

The invention pertains to a containment system for a nuclear power plant which provides protection in the event of a loss of coolant accident or other malfunctions wherein the stored energy within the components of the system is contained and absorbed by the use of a plurality of coolant reservoirs capable of absorbing steam and supplying coolant to the reactor coolant system and feedwater to the secondary systems. The system includes a plurality of steam generators which may selectively be employed as an energy source during cooldown, and the design of the reservoirs provides high initial energy absorption as well as extended energy dissipation during cooldown.

2 Claims, 12 Drawing Figures

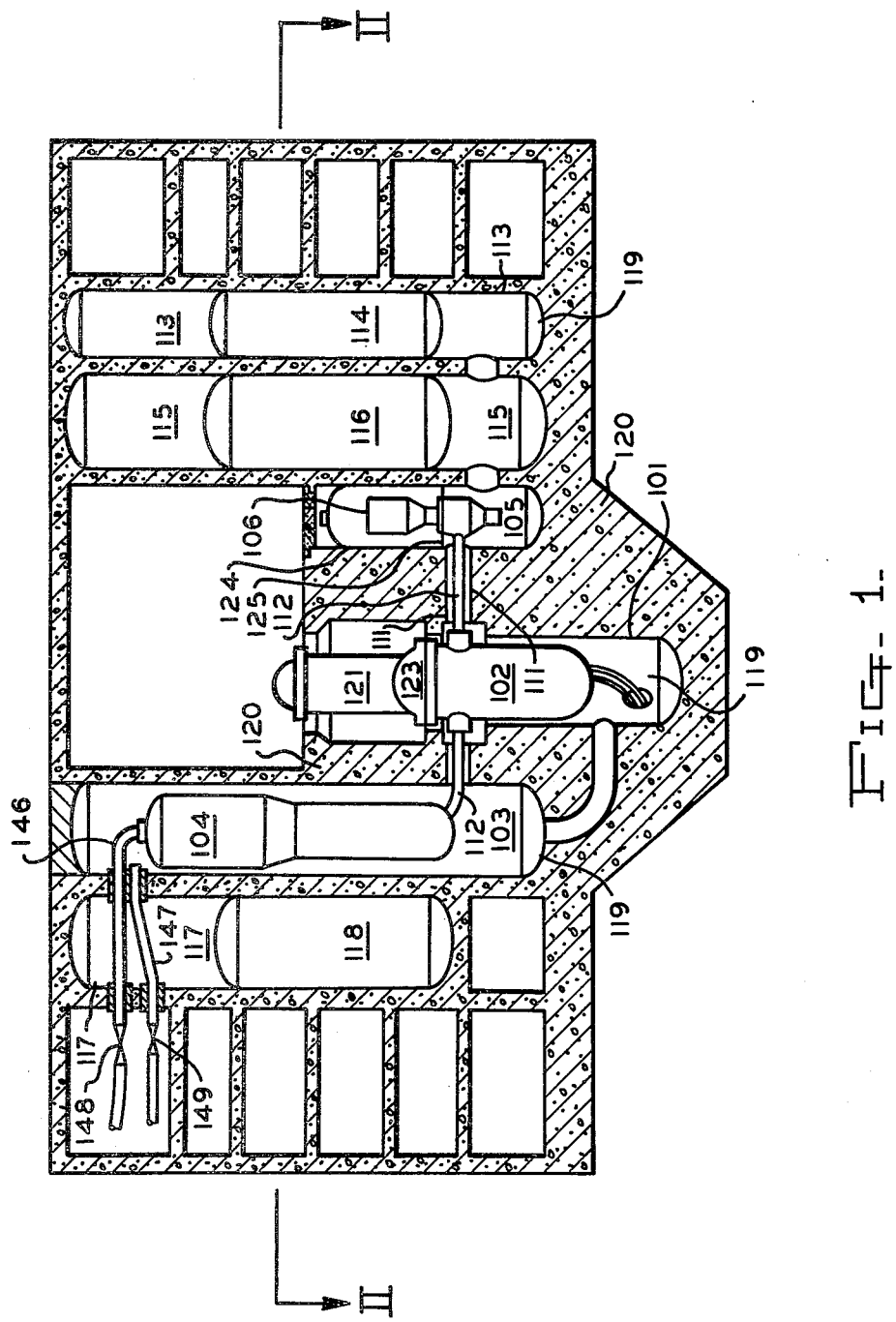

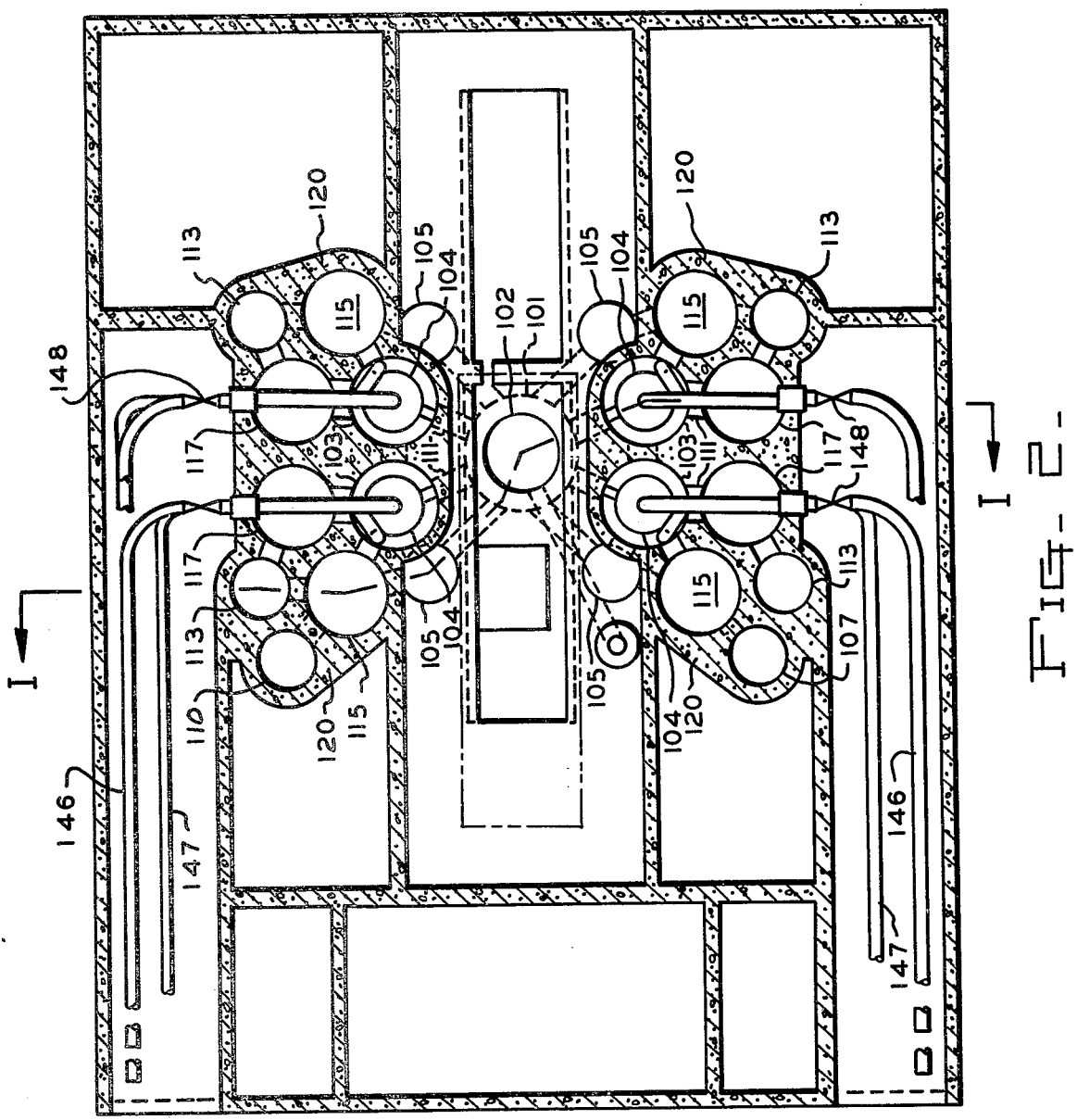

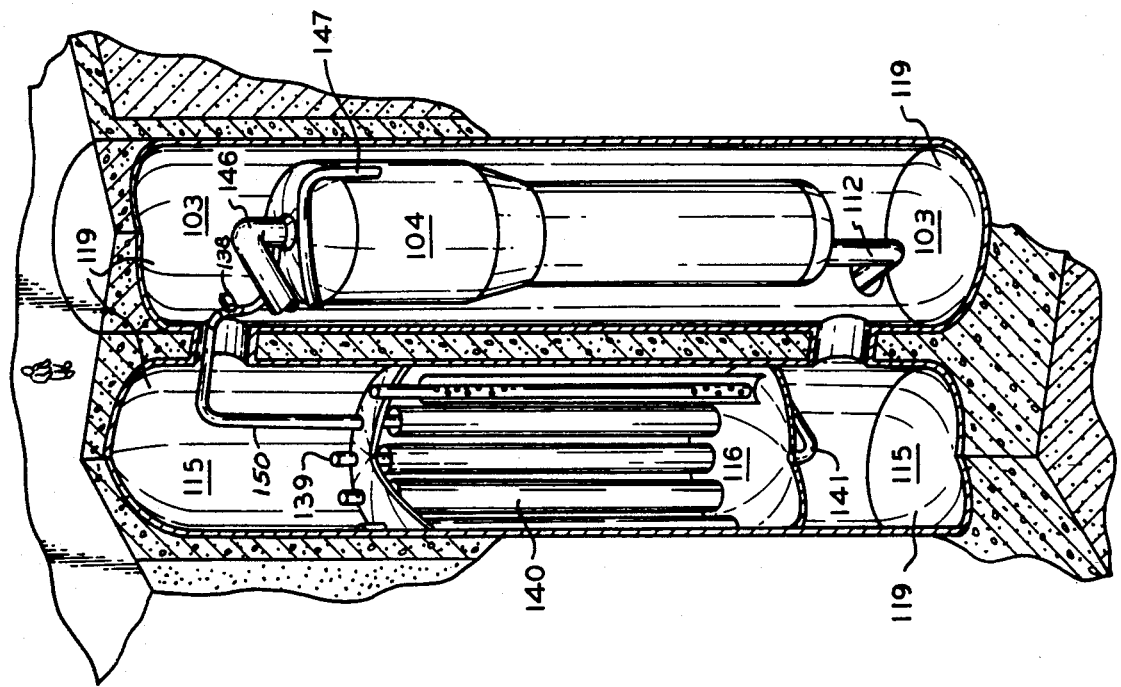
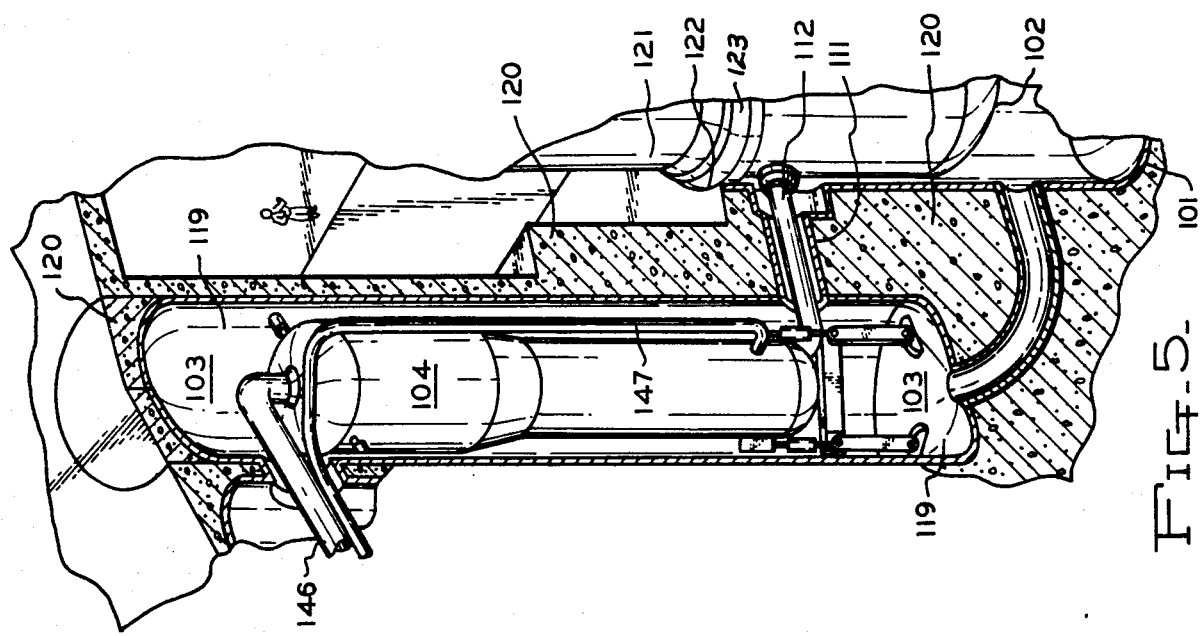

PASSIVE CONTAINMENT SYSTEM

BACKGROUND OF THE INVENTION

1. Field of the Invention

Nuclear power plants, because of the potential accidental release of radioactive materials, are required by practice to be designed in such a manner that the health and safety of the public is assured even in the event of the most adverse accident that can be postulated. In nuclear power plants utilizing light water as a coolant, the most adverse accident possible is considered to be a double-ended break of the largest pipe in the reactor coolant system and such an accident is commonly termed the Loss Of Coolant Accident, hereinafter sometimes referred to as LOCA.

For accident protection, plants utilizing light water as the coolant employ containment systems designed to physically contain water, steam and any entrained fission products that may escape from the reactor coolant system. The containment system is normally considered to encompass all structures, systems and devices that provide ultimate reliability and complete protection for any accident that may occur. Engineering safety systems are specifically designed to mitigate the consequences of an accident, and the design goal of a containment system is that no radioactive material will escape from the nuclear power plant in the event of an accident.

The passive containment system disclosed herein provides this desired level of protection for a loss of coolant accident and for other types of accident that are considered as a basis of design, and the concepts of the invention are considered to be effective for nuclear power plants employing either pressurized water reactors or boiling water reactors.

2. The Prior Art

In order to provide containment for light water cooled nuclear power plants prior art techniques have basically utilized either full-pressure "dry-type" containment or pressure suppression containment.

In a full-pressure containment the reactor building, completely enclosing the reactor coolant system, is capable of withstanding the pressure and temperature rise expected to occur in the event of a LOCA. The builidng is usually constructed either of steel or steel-lined reinforced concrete or prestressed concrete.

Full-pressure containment systems may include double leakage control barriers and subatmospheric pressure operation. For the double leakage-control barrier any leakage into the control annulus is either pumped back into the primary containment, or the leakage is treated before being exhausted to the outside atmosphere. For subatmospheric operation the containment is normally maintained at partial vacuum, and following the LOCA, the pressure is reduced back to less than the outside atmosphere utilizing active engineered safety systems to terminate any potential release of radioactivity to the environment.

The pressure-suppression containment consists of a drywell that houses the reactor coolant system, a pressure-suppression chamber containing a pool of water, and a vent system connecting the drywell to the pool of water. This containment structure is constructed of steel enclosed by reinforced concrete, or is steel-lined with reinforced concrete. The pressure-suppression containment is housed within a reactor building. In the event of a LOCA, the reactor coolant partially flashes to steam within the drywell, and the air, steam and liquid coolant flow through the connecting vents into the pool of water in the suppression chamber. The steam is condensed by the water and decreases the potential pressure rise in the containment. The air rises into the free space above the pool of water in the suppression chamber.

Refinements in pressure-suppression containment utilizing water includes the inerting of the containment atmosphere. Inerting is aimed at preventing the burning of hydrogen produced from metal-water reaction of overheated nuclear fuel.

A different type of pressure-suppression containment utilizes an ice-condenser. The ice is maintained in a refrigerated compartment surrounding the reactor coolant system. The ice-condenser containment is divided into an upper chamber and a lower chamber with the reactor coolant system in the latter. In the event of a LOCA a pressure rise of the lower chamber causes access panels located at the bottom of the ice-storage compartment to open. This provides a flow path for air and steam through the ice bed. The steam is condensed by the ice and decreases the potential pressure rise in the containment. The air passes into the upper chamber through top access panels forced open by the flow of air.

Full-pressure containment and pressure-suppression containment are passive structures that require support systems for containment of the accident. Active systems such as residual heat removal systems and containment spray systems are used to dissipate heat to the environs. This prevents the containment design pressure and temperature from being exceeded and in the process, the containment pressure is reduced to limit the leakage of fission products. Active filtration systems are required in conjunction with the spray systems to reduce fission product concentration in the containment atmosphere. This also limits the amount of fission products that can leak out of the containment to the environs. Hydrogen recombiners are also being utilized to protect the containment from developing explosive concentrations of hydrogen.

To be effective, both the full-pressure containment and the pressure-suppression require additional engineered safety systems that provide emergency cooling of the nuclear fuel. Pressurized water reactors require passive accummulator systems in addition to active high and low pressure injection systems to maintain an adequate amount of liquid coolant at the nuclear fuel. The residual heat removal systems used for containment pressure reduction also reject decay heat to the environs.

Pressure suppression with gravity flooding has also been proposed as an engineering safety system for a LOCA.

Active engineered safety systems are inherently required to function effectively in order to maintain the integrity of the containment system in the LOCA. Active systems require high integrity instrumentation and control equipment, rotating machinery, electric power sources and power distribution equipment. These systems need to function properly as part of a larger system under adverse containment environment conditions of high-pressure, high-temperature, high-humidity, high-radioactivity, and eroded thermal insulation.

Malfunctioning of any active engineered safety system imposes even more adverse conditions on the operable system. For instance, an inadequate source of electric power may result in the malfunctioning of the emergency core cooling system for the nuclear fuel. Overheating of the fuel can result in melting of the fuel cladding with metal-water reactions occuring. The fuel core may slump and portions could collapse and overheat the bottom of the reactor vessel. Hydrogen is released from metal-water reactions and is subject to burning. The added energy from the metal-water reactions and from the burning of hydrogen imposes even more severe requirements on containment structure. Overheating of the fuel and melting of the cladding results in a gross release of fission products that are available for leakage from the containment system. This example points to the critical nature of active engineering safety systems that are an essential part of the containment system of the prior art.

The prior art has proposed a variety of solutions to the containment of a nuclear power plant in the event of a LOCA, and in my U.S. Pat. Nos. 3,984,282 and 4,050,983, I have proposed passive containment systems for confinement of the coolant in the event of a LOCA, and for cooling the reactor assembly in the event of such an accident. Further, in my U.S. Pat. No. 3,865,688 I have disclosed a passive confinement system utilizing many of the concepts herein set forth, and this invention constitutes an improvement over that specifically set forth in U.S. Pat. No. 3,865,688.

SUMMARY OF THE INVENTION

The invention relates to a nuclear reactor containment arrangement, and more particularly, to an entirely passive containment system which encloses a reactor system using a high-pressure, high-temperature coolant and/or moderator such as light or heavy water.

In this invention, the passive containment system is used to safely contain even the most adverse reactor accident wherein a sudden rupture of the reactor piping occurs resulting in the loss of coolant. The passive containment system herein provides equal protection for nuclear reactor system of the pressurized water or boiling water types.

The containment system of the invention as used for a pressurized water reactor consists of interconnected cells; each cell housing a major component of the nuclear reactor system; i.e., reactor vessel, steam generators, pumps, pressurizer, regenerative heat exchanger, and piping. Cells are also provided for the engineered safety system components. Water-filled deluge tanks, quench tanks and reactor vessel refill tanks are located entirely within containment cells at an elevation above the reactor coolant system piping. Within the containment cells a primary container formed from interconnected steel shells encloses the entire reactor coolant system. The primary container is encased by reinforced or prestressed concrete.

The water used within the reactor vessel refill tanks, within the deluge tanks, and within the quench tanks, is specially treated for accident containment purposes. The water is degassed and contains chemicals in solution that serve as a poision to neutrons, inhibitors of corrosion, oxygen "getters", and radio-nuclide getters. The water within the tanks is retained in a chilled condition by suitable refrigeration means such as a steam-jet refrigeration system or other refrigeration system.

The passive containment system is housed within a reactor building. The arrangement of the cell structures permits the relocation of spent fuel storage pools and a refueling cavity and other equipment enclosures within the reactor building.

In a typical response of the passive containment system hereof to a LOCA, decompression of the reactor coolant through the pipe break produces steam within the primary container which is normally maintained at a high vacuum. The steam pressurizes the containment and the steam overpressure is vented into the deluge and quench tanks.

During reactor coolant blowdown, the hydrostatic pressure within the reactor vessel refill tanks causes check valves in the high-pressure injection pipe to lift, and treated water is injected into the reactor coolant system. The decompression of the refill tanks causes check valves in the steamlines between the steam generator secondaries and the refill tanks to lift. This initiates steam flow from the steam generators through jet injectors and steam flow through the injectors entrains treated water from the refill tanks. The steam and water are intimately mixed on passage through the diffuser sections of the injectors to provide a homogeneous solution of treated water that quenches the fuel elements, refills the reactor vessel and overflows through the pipe break into the containment.

The elevated deluge and quench tanks include steam vent conduits communicating with the cooling liquid therein and with the containment. Thus, upon the containment being pressurized with steam due to the LOCA the steam within the containment will enter the deluge and quench tanks through their vent conduits and the chilled water in these tanks absorbs the heat energy within the steam. When coolant blowdown is arrested a gravity flow of the borated water from the deluge tanks continues emergency core cooling with flow through the pipe break that resulted in the loss of coolant. All stored energy within the reactor system is absorbed by the refill and deluge water flow, and sufficient heat capacity is provided in the chilled, stored water within the refill, deluge and quench tanks to reduce temperatures to low levels. The containment atmosphere is restored to the normal high-vacuum condition by the vapor carryover. The heat-sink capacity of the water in the quench tanks provides a vented containment for the term of the accident, and the borated water in the deluge tanks will provide four hours of passive decay heat removal.

In the disclosed embodiment a four loop system is disclosed in conjunction with a single reactor vessel. Accordingly, four steam generators, four refill tanks, four deluge tanks, and four quench tanks are used with the preferred embodiment. A single pressurizer is employed to maintain the pressure within the reactor coolant system. Each steam generator includes a primary system receiving heat from the reactor coolant system and the steam generators transfer this heat to their secondary system which produces steam for utilization purposes, such as powering a turbine.

In addition to utilizing the deluge tanks and quench tanks for steam venting and absorption purposes with respect to steam within the containment, these tanks also include steam absorbing means connected to the associated steam generator secondary system through electrically operated valves. Thus, thermal energy can be selectively absorbed within the deluge and quench tanks from the steam generator secondary system by operation of selective valves, and with certain types of malfunctions or leakage, this type of reactor cooldown is utilized. In such instance the transfer of heat from the generator secondary systems likewise cools the reactor coolant through the primary system and the heat absorption capacity of the deluge and quench tanks is sufficient to adequately cool the system for control purposes.

In a major LOCA it is possible to use the thermal energy within one steam generator secondary system for the introduction of coolant into the reactor coolant system from refill tank injectors, while the energy within the generator secondary systems of other generators is being dissipated through direct injection of secondary steam into the associated deluge and quench tanks, thereby providing a simultaneous replenishing of reactor coolant and dissipation of the energy within the power plant.

The quench tanks, in addition to absorbing vented steam, and steam injected therein from a secondary system, also include a steam-powered injector supplied with steam from the associated generator secondary system having a discharge communicating through a check valve with the associated generator secondary feedwater system. Thus, operation of the quench tank injector introduces auxiliary feedwater into the associated generator secondary system, and this operation is employed in the event of feedwater malfunctioning assuring a supply of feedwater in the event the accident restricts or eliminates the normal feedwater source.

OBJECTS OF THE INVENTION

It is a general object of the invention to provide a new and improved containment method and apparatus for any energy, toxic or radioactive materials released from a process system accommodated therein.

It is a more particular object of the invention to provide a passive containment system process and apparatus for a nuclear reactor power plant system.

Another object of the invention is to provide functional improvements in the complete containment of a nuclear reactor system through passive means actuated, controlled, powered and maintained by the forces of nature that are designed to be intrinsic to the containment system.

A further object of the invention is to provide a reactor containment system which is less expensive to construct than similar prior systems in that the primary containment free volume is effectively reduced and less expensive materials are required.

Another object of the invention is to provide a passive containment system that utilizes the forces of physics to provide the ultimate level of reliability in the containment of nuclear power plants.

An additional object of the invention is to provide passive emergency core cooling utilizing passive reactor vessel refill decay heat transfer utilizing the energy within the reactor power plant system.

Another object of the invention is to provide a nuclear power plant containment system which permits plant recovery from all design basis accident including the loss of coolant accident.

An additional object of the invention is to provide a nuclear power plant heat removal system utilizing a plurality of coolant reservoirs wherein the coolant within the reservoirs may be selectively used for heat absorption by the venting of steam therein, and selected reservoirs permit coolant to be supplied directly to a reactor coolant system, in all events, the cooling capacity within the reservoirs being sufficient to achieve reactor cooldown.

Yet another object of the invention is to provide a a nuclear reactor power plant system employing a plurality of steam generators and coolant reservoirs wherein energy within the steam generators may be selectively dissipated within the reservoirs, and energy within the generators may also be employed to introduce coolant directly into the reactor coolant system, and feedwater in the secondary system.

BRIEF DESCRIPTION OF THE DRAWINGS

The aforementioned objects and advantages of the invention will be appreciated from the following description and accompanying drawings wherein:

FIG. 1 is a vertical section of the reactor building arrangement in accord with the invention taken through a deluge tank cell, a steam generator cell, the reactor vessel cell with interconnecting pipe cells, a quench tank cell, and a refill tank cell substantially along section line I—I of FIG. 2, FIG. 2 is a plan, cross-sectional view of the reactor building substantially as taken along Section II—II of FIG. 1, FIG. 5 is a detail, sectional, perspective view of a steam generator and cell in accord with the invention, FIG. 6 is a detail, sectional, perspective view of a deluge tank and cell.

DESCRIPTION OF THE PREFERRED EMBODIMENT

Figure 4:
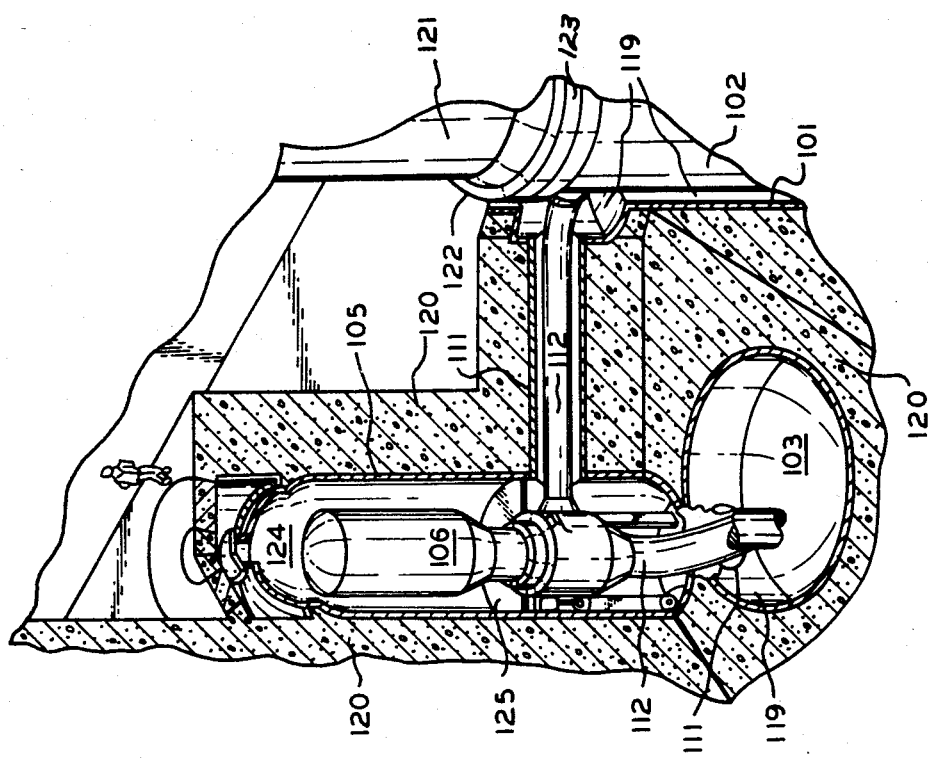
FIG. 4 is a sectional, detail, perspective view illustrating the reactor coolant pump cell and a portion of the reactor vessel.
Figure 3:
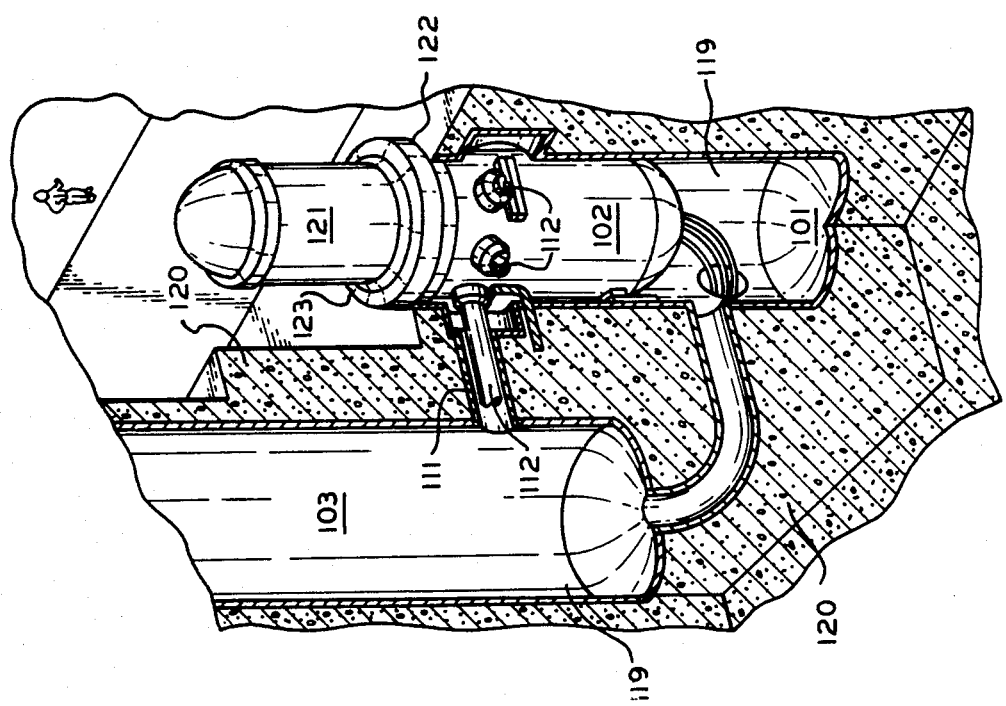
FIG. 3 is a partial sectional perspective detail view of the reactor vessel and associated cell.
Figure 8:
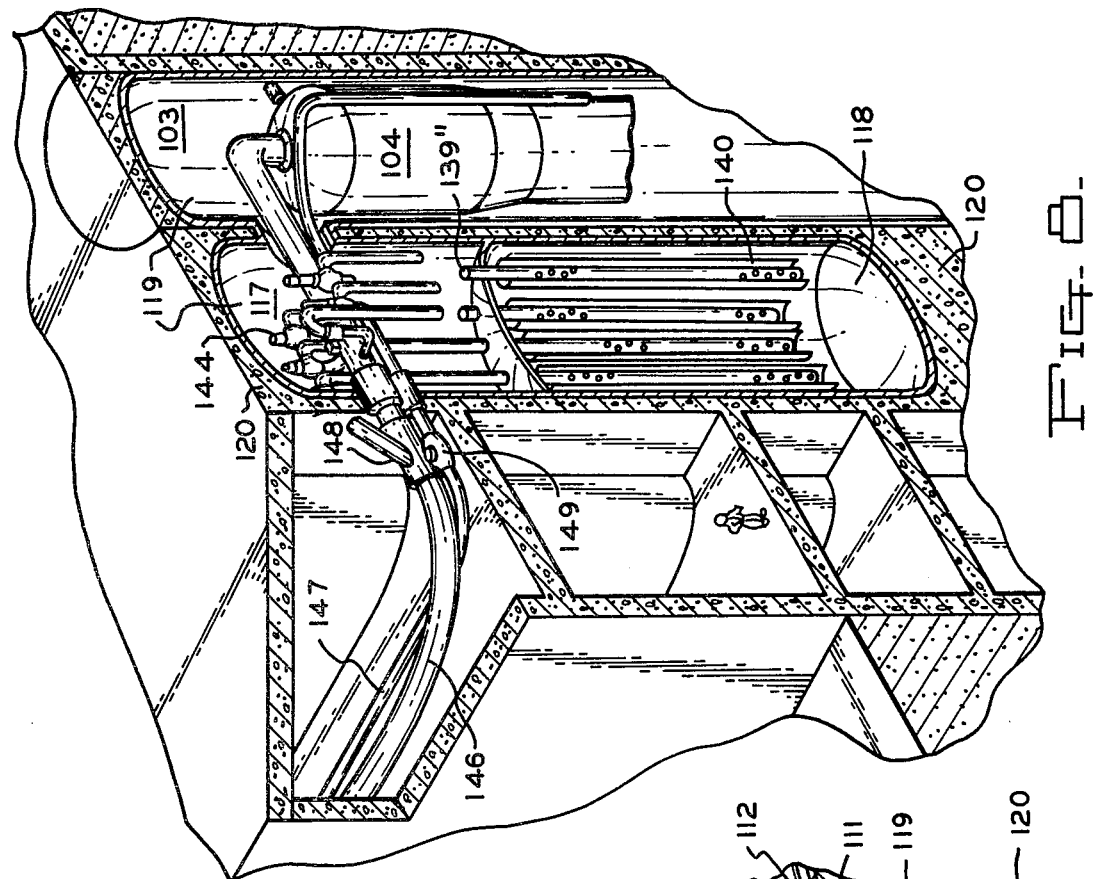
FIG. 8 is a detail, sectional, perspective view of a steam generator and quench tank cell and associated components, including conduits and housing reactor structure cells.
Figure 7:
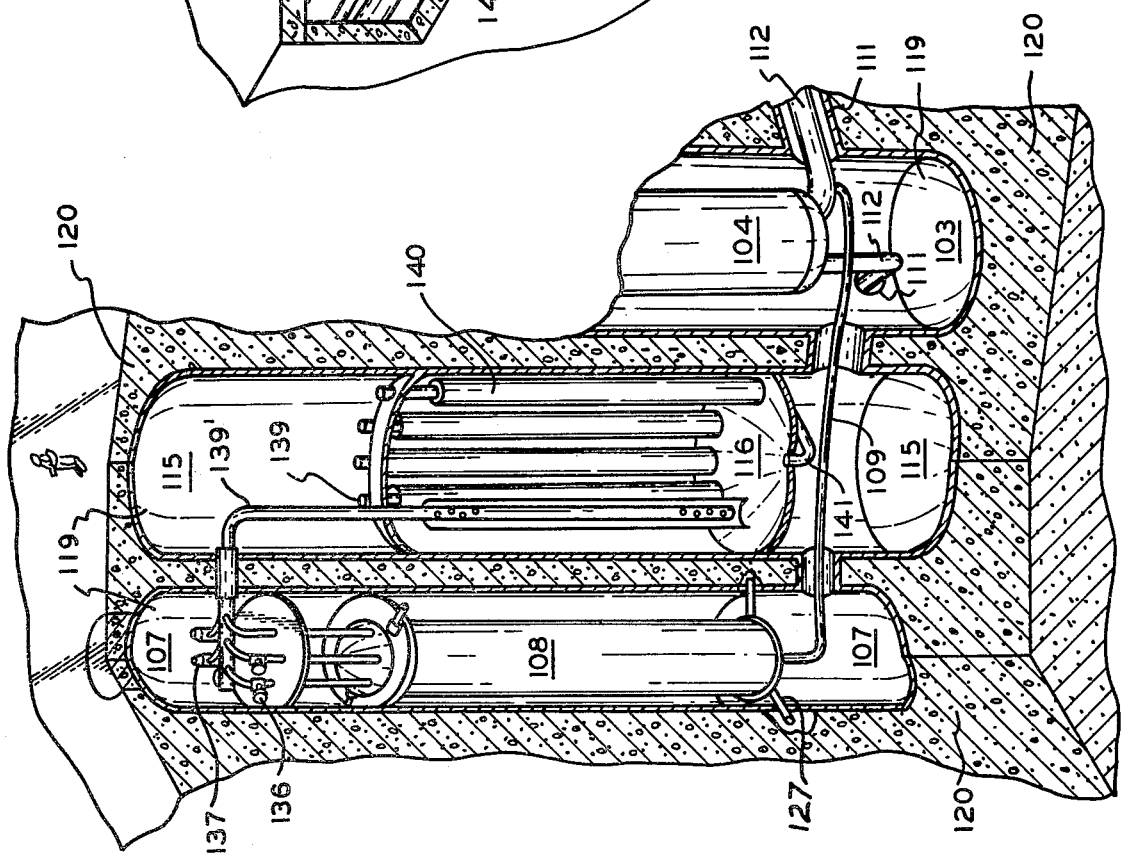
FIG. 7 is a detail, sectional, perspective view illustrating a pressurizer cell and pressurizer, a deluge tank cell and deluge tank, and a portion of a steam generator.

Referring to the drawings, a passive containment system for a four-loop pressurized water reactor is disclosed. Basically, the system includes a plurality of interconnected steel cells located within the concrete housing, the steel cells enclosing the reactor coolant system and the engineered safety system components. Centrally, the reactor vessel cell 101 houses the reactor vessel 102.

Four steam generator cells 103 each house a steam generator 104, and four reactor coolant pump cells 105 each house a reactor coolant pump 106. A pressurizer cell 107 confines the reactor coolant pressurizer 108 and a surge line 109 interconnects the pressurizer to the reactor system. A regenerative heat exchanger cell 110 houses a high-pressure regenerative heat exchanger, which is not shown. Pipe cells 111 enclose the reactor coolant system piping which is indicated at 112.

The engineered safety components include four refill tank cells 113 which each enclose a reactor vessel refill tank 114. Four deluge tank cells 115 each encompass a deluge tank 116, and four quench tank cells 117 each house a quenchtank 118.

The aforedescribed interconnected steel cells form a leak-proof structure for the reactor coolant system and this system of cells is designated as the primary reactor containment 119.

During reactor operation the free space within the containment 119 is maintained at a high vacuum to eliminate the need for thermal insulation at the exterior surface of the reactor coolant system. During reactor shutdown for maintenance operations, air at atmospheric pressure is circulated within the containment 119.

The cells for the various components are encased within a concrete housing or structure, generally indicated at 120, except at the upper end of the reactor vessel. The concrete structure 120 provides structural support for both the containment cells and the components therein, and a sufficient thickness of structural concrete is provided to serve as biological shielding. The refueling enclosure above the reactor vessel is filled with water for shielding purposes, and protection against penetrating radiation is therefore provided to the occupants within the reactor building for both normal reactor operation and for all postulated accidents within the containment including the LOCA.

A number of compartments are provided for portions of the reactor coolant system components. A compartment is formed by a steel shroud 121 that encloses the control rod drive thimbles. A steel diaphragm seal 122 bridges the annular space between the reactor vessel flange 123 and the reactor vessel cell 101. Each pump cell 105 includes a pump motor compartment 124. A steel diaphragm seal 127 bridges the annular space between the pump casing and the pump cell 105.

A pressurizer compartment 126 is provided, and a steel diaphragm seal 125 bridges the annular space between the lower head of the pressurizer 108 and the pressurizer cell 107. The compartments can be supplied with either an air or inert gas atmosphere for ventilation or cooling, and at the same time the rest of the free space in the containment can be maintained at a high vacuum or at atmospheric pressure.

The water filled tanks, which comprises the components of the engineered safety systems, are elevated for functional purposes. The refill tanks 114, and the deluge tanks 116, and preferably, the quench tanks 118, contain neutron poison in solution. The contents of the tanks are maintained at a low temperature by mechanical refrigeration units, not shown. A sufficient amount of cooling liquid is provided within the refill tanks 114 to quench the steam in the steam generator 104 secondary systems and to overflow through the postulated pipe break in the LOCA. The deluge tanks 116 contain a sufficient amount of fluid to quench the steam carryover from the containment in the LOCA, and then fill the containment 119 free volume to an elevation above the postulated reactor coolant system pipe break. The fluid in the quench tanks 118 provide sufficient heat sink capacity to prevent containment over pressure during the term of the LOCA. The combined heat sink capacity of the deluge and quench tanks enable reactor cool down to a cold shutdown condition on turbine trip or on the loss of the offsite electric power.

The liquid within the refill tanks 114 is utilized for emergency reactor core cooling in the LOCA. The steam line 128 communicating with the associated steam generator 104 through an isolation valve enters the associated refill tank where it is branched to a number of refill steam jet injectors 129 defined in the refill tank. The injector nozzles are so positioned at a tube sheet 130 to enable pressurization of the cooling liquid below the tube sheet by the steam flow through the injectors 129, and this pressurized fluid is in communication with a high pressure injection pipe 131 communicating with the lower region of the associated refill tank, and the pipe 131 communicates with the cold "leg" of the reactor coolant system. Each pipe 131 has one or more check valves 132, FIG. 10, and isolation valves 133 for operational purposes. Each steam line 128 also includes one or more check valves 134 and isolation valves 135. The isolation valves 133 and 135, and valves subsequently designated by similar terms, are preferably of the electrically operated type.

Figure 11:
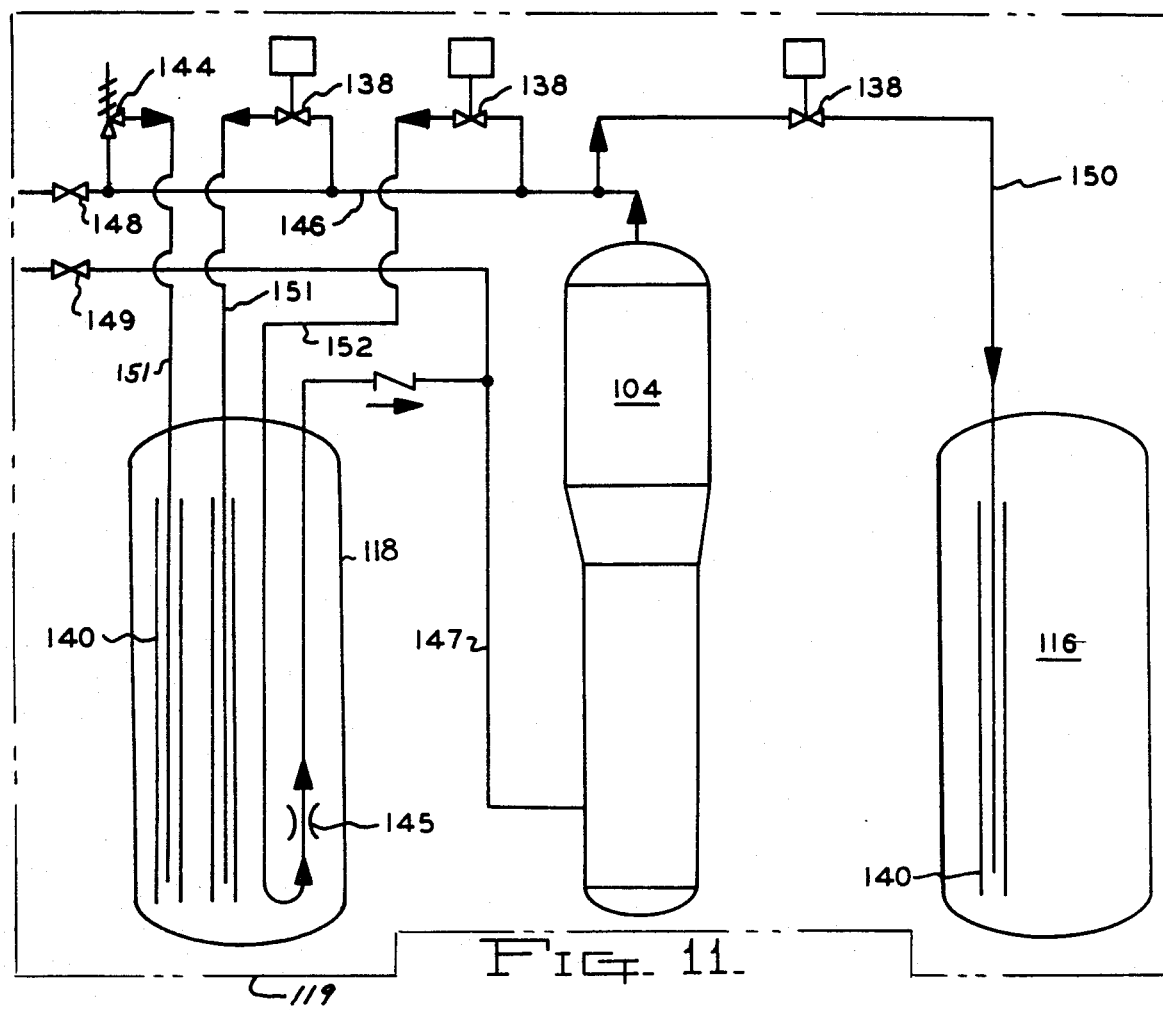
FIG. 11 is a schematic representation of a steam generator and associated deluge and quench tanks illustrating the tank structure associated with the generator secondary for direct quenching of the secondary steam, and the introdudction of feedwater into the steam generator.

The cooling liquid within the deluge tanks 116 is utilized for various selective purposes, such as quenching steam within the containment system in the event of a LOCA, thermal absorption by steam quench in the event of overpressure discharge from the pressurizer relief valves 136 and safety valves 137, and for steam quenching purposes in the event of an overpressure discharge from the associated steam generator relief valve 138, FIG. 11. Each deluge tank has twelve or more 12 inch vent pipes 139 that penetrate the tank top head and extend almost the full length, or depth, of the tank. The vent pipes 139, within the tank, are perforated by thousands of small orifices submerged within the cooling liquid to facilitate an immediate quench of steam entering the vent pipes 139 by the chilled water within the tanks. Each vent pipe is encircled by a spaced shroud pipe 140 which promotes thermal circulation past the vent pipe orifices within the tank in that the shroud pipes produce a "chimney" effect and the thermal circulation of the cooling liquid past the orifices tends to "scrub" the orifices with cooling liquid to improve the heat transfer between the steam entering the cooling liquid, and the cooling liquid.

Each deluge tank is additionally provided with vent pipes 139' which are connected to the discharge from the pressurizer relief valves 136 or the pressurizer safety valves 137, or to the relief valves 138 communicating with the associated steam generator secondary. In FIG. 11 the vent pipe 150 is that conduit which communicates the associated steam generator secondary relief valve 138 with the deluge tank 116. In the four-loop system disclosed, the pressurizer includes two relief valves 136 and two safety valves 137, and the discharge from two of the relief valves 136 is connected to the vent pipes 139' of two separate deluge tanks, while the two pressurizer safety valves 137 are each connected to the remaining two deluge tanks vent pipes 139' wherein each of the relief and safety valves of the pressurizer are associated with a different deluge tank, and this relationship permits the thermal energy within the reactor coolant system to be distributed between the four deluge tanks of the four-loop system in the event of reactor coolant overpressure.

Figure 10:
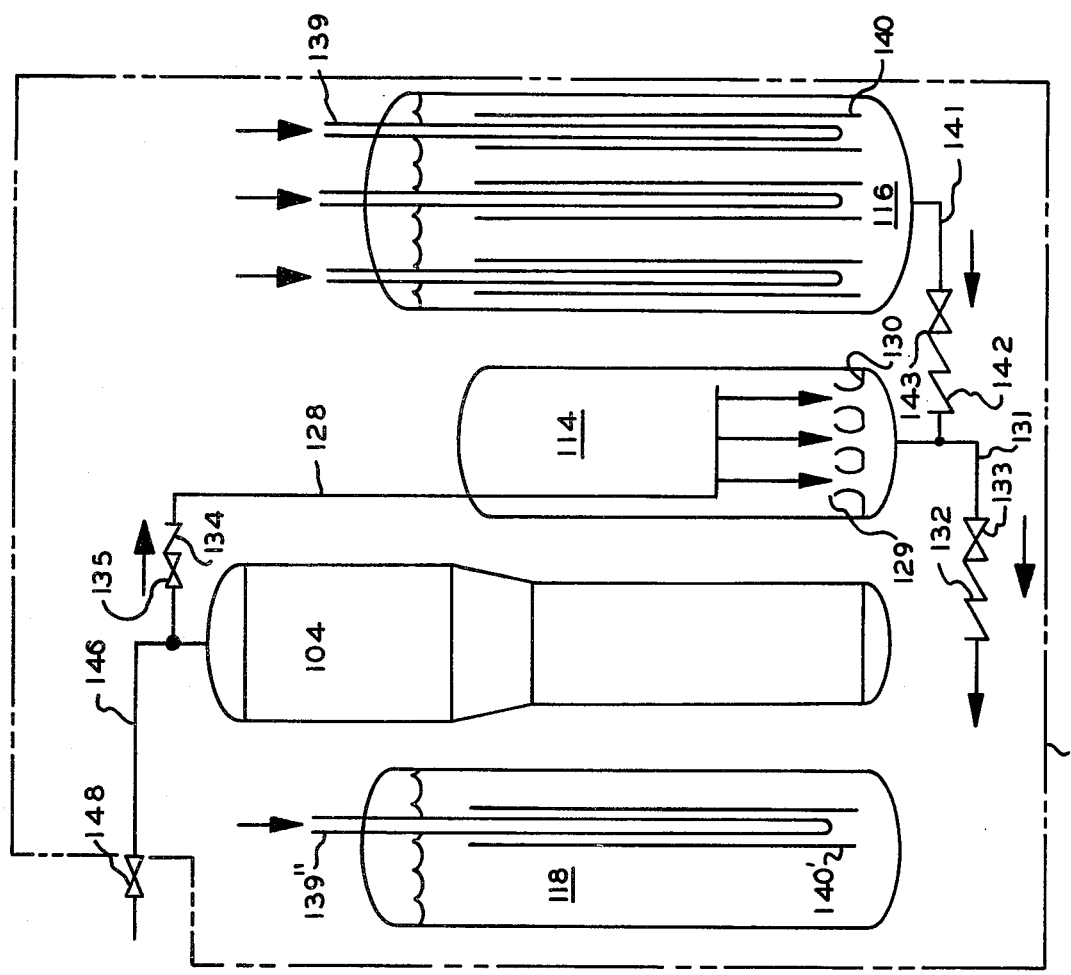
FIG. 10 is a schematic representation of a steam generator and associated refill, deluge and quench tanks illustrating conduit interconnection between the refill and deluge tanks, and between the steam generator secondary and the refill tank.
Figure 9:
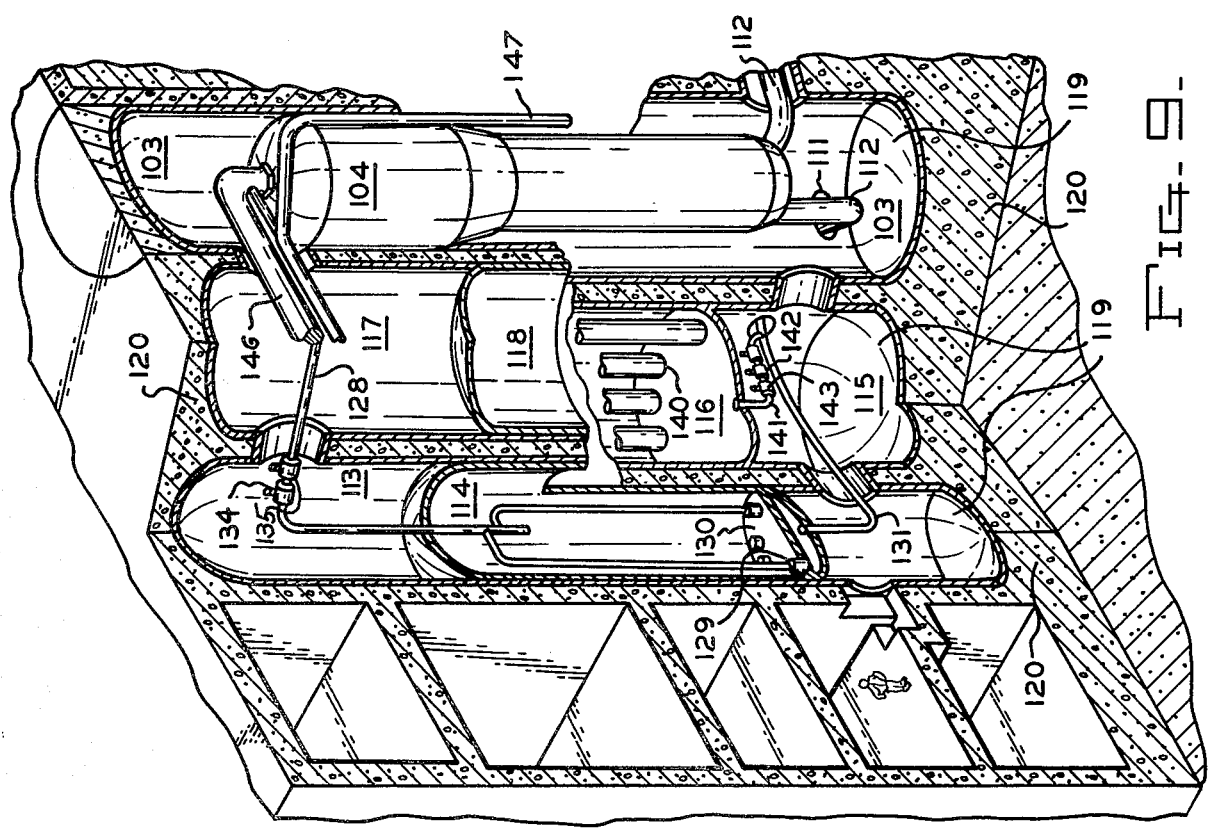
FIG. 9 is a detail, elevational, sectional, perspective view illustrating the relationship between a refill tank, deluge tank, quench tank and steam generator, the deluge tank being located behind the quench tank.

Each deluge tank 116 includes an injection pipe 141 communicating with the lower region of the tank, and is illustrated in FIG. 10, the pipe 141 communicates with the refill tank discharge pipe 131 through one or more check valves 142 and an isolation valve 143. The presence of the pipe 141 permits the cooling liquid within the deluge tank to be selectively supplied to the reactor coolant system upon the pressure within the reactor coolant system being less than the static head pressure of the deluge tank within pipe 141.

The liquid within the quench tanks 118 is used to quench a portion of the steam resulting from reactor coolant blowdown in a LOCA. The balance of the heat sink capacity of the quench fluid is retained for protection against containment over pressure and the quench tank provides a vented containment for this purpose.

Each quench tank has one or more 12 inch vent pipes 139" that penetrate the tank top head and extend almost the depth of the tank. The vent pipes 139" are identical to the vent pipes 139 of the deluge tanks, and include many small perforations submerged in the cooling liquid to facilitate an immediate quench of the steam carryover within the containment by the chilled water in the event of a LOCA. Each vent pipe 139" is encircled by a shroud pipe 140' to promote thermal circulation past the orifices, as previously described. The number of vent pipes 139" in the quench tanks are considerably less than the number of vent pipes 139 in the deluge tanks, and comparatively, the vent area in a quench tank is a fraction, approximately 1/12, of the vent area in the deluge tanks. Thus, the quench tanks retain heat sink capacity for the term of the LOCA duration.

In addition to the vent pipes 139", each quench tank is provided with apparatus for serving as a heat sink to absorb steam blow-off from the associated steam generator relief valves 138 or safety valves 144. For this purpose the conduits 151 connect to the steam generator steam line 146 through valves 138 and 144, FIG. 11, and each quench tank is also provided with a steam supply line 152 which communicates with generator secondary steam line 146 through an isolation valve 138 wherein steam may be supplied to an injector 145 located within the quench tank having a discharge conduit communciating with the steam generator secondary feedwater line 147 through a check valve, FIG. 11. Thus, the entrance of steam within conduit 152 permits coolant to be removed from the associated quench tank 118 through an injector 145 wherein the coolant may be used as an auxiliary feedwater source for the steam generator in the event of emergency conditions. The primary steam generator steam line 146 includes an isolation valve 148, while the supply of feedwater to conduit 147 is normally controlled by isolation feed valve 149.

With reference to FIGS. 10 and 11, it is to be appreciated that the systems disclosed in these figures are schematic and do not fully disclose all of the venting or thermal absorption structure associated with each deluge and quench tank. For instance, in FIG. 10 only the containment venting pipes are shown for the deluge and quench tanks, while in FIG. 11 steam generator relief venting operation is disclosed with respect to deluge tank 116, while in FIG. 11 the thermal absorption venting means connected to the steam line 146 are illustrated, as is the steam supply conduit 152, the injector 145 and the generator feedwater pipe 147.

The passive engineered safety features in the disclosed pressurized containment system offer flexibility for plant operation. One arrangement for normal operation is described for the four-loop pressurized water reactor. Two of the four steam generators 104 are used for high-pressure safety injection in the event of a LOCA and this requires that two of the isolation valves 135 on the steam lines 128 be locked open, and two are locked closed. In the postulated LOCA this arrangement provides continued high-pressure safety injection utilizing the stored energy in two steam generators. The other two steam generators remain available for decay heat removal from the core heat and secondary system and reactor coolant system cooldown.

General Operation

The response of the passive containment system to a LOCA is described for a containment design for about 75 psia back pressure. A four-loop pressurized water reactor and normal operation generating 1000 megawatts of electricity is selected for illustrative purposes. The design values specified are in the design range typical for the nuclear plant selected. Similar evaluations of the passive containment system can be made for all pressurized water reactors including the two and three-loop designs, as well as for all boiling water reactors.

In the reactor system selected, the coolant absorbs heat on passage through the reactor vessel 102, releases the heat to generate steam in passage through the steam generators 104, and is recirculated through these components by the reactor coolant pumps 106. The pressurizer 108 maintains the reactor coolant at about 2250 psia pressure to suppress boiling. The reactor coolant system is interconnected by piping 112, and contains approximately 540,000 pounds of coolant with about 314,000,000 British thermal units (BTU) of stored energy in the coolant at a weighted average temperature of 578° F.

The primary containment 119 is designed with a free volume of approximately 250,000 cubic feet, and the air within this space is initially substantially removed by steam ejectors, or other vacuum producing apparatus, and maintained at less than 2 psia total pressure by a vacuum pump.

The four deluge tanks 116 within the primary container together hold about 3,330,000 pounds of fluid maintained at 50° F. A total free board, slightly in excess of 5000 cubic feet in the deluge tanks, is maintained at less than 2 psia.

The four quench tanks 118 altogether contain about 3,330,000 pounds of fluid maintained at 50° F. A total free board slightly in excess of 5000 cubic feet in the quench tanks is maintained at less than 2 psia total pressure.

The four refill tanks 114 together contain approximately 1,450,000 pounds of treated water maintained at 50° F. and 1000 psia hydrostatic pressure. The secondary systems of the four steam generators 104 contain approximately 400,000 pounds of fluid with an energy content approaching 550,000,000 BTU. The steam generators operate in the 1000 psia range at rated load.

The unique engineered safety system components within the pressurized containment system are designed to be possibly responsive in providing inherent safety to the public during accidents that could endanger public health. As a basis of design for a nuclear power plant, it is postulated that a spectrum of pipe breaks can occur in the reactor coolant system, or in the secondary system and be controlled in the manners set forth below.

OPERATION IN THE EVENT OF ACCIDENT

Design Basis Loss of Coolant Accident

In the design basis LOCA the largest pipe 112 at the reactor coolant system ruptures. A free blow-down of coolant from the two open ends of the ruptured pipe occurs and the bulk of the coolant blow-down occurs in less than 10 seconds, and the blow-down is complete within about 27 seconds.

Decompression of the reactor coolant through the break results in the flashing of a portion of the coolant blow-down into steam. The steam pressurizes the evacuated containment 119 free volume, and within a very short time, such as one second, after the break steam pressure within the containment of about five psia forces the water in the deluge and quench vent pipes 139 and 139″ to flow through the associated submerged vent orifices wherein the water within the vents is replaced by the steam from within the containment and this steam from the containment is quenched by the chilled water within the deluge and quench tanks. Maximum steam carryover occurs at about 4 seconds into the accident with about 13,300 pounds per second of steam representing 15.7 million BTU's per second of energy, quenched by the stored water.

Initially, the steam flashing rate from the coolant blow-down exceeds the rate of steam carryover into the deluge and quench tanks. As the containment 119 pressure increases the steam flow rate through the vent pipes 139 and 139″ increases until a choked flow condition occurs. As the coolant system is depressurized, the rate of blow-down and steam flashing decreases. The containment pressure peaks at about the time that the rate of steam carryover equals the rate of steam flashing.

The steam carryover increases the liquid volume and temperature within the deluge and quench tanks. With initial vacuum conditions, both in the containment free volume and at the deluge and quench tanks free board, the liquid volume and temperature increase as the result of steam carryover does not impose an appreciable back pressure on the containment for the post accident period. The post accident free board and the deluge tanks is at a pressure of 2.1 psia, the saturation pressure of the 128° F. water.

Figure 12:
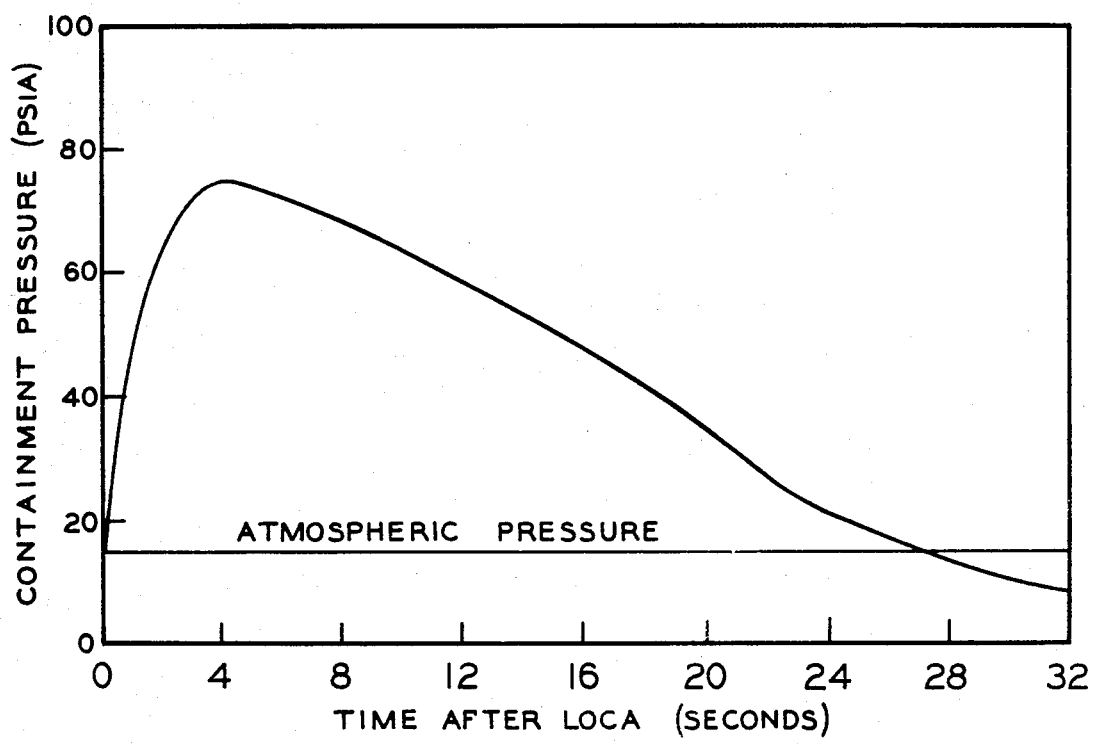
FIG. 12 is a graph illustrating the containment pressure response upon the occurance of a double ended pump suction break loss of cooling accident.

The evacuated containment 119 and steam carryover into the deluge and quench tanks has a decided beneficial effect on the LOCA. A curve of the containment pressure response to the pump suction break is shown in FIG. 12. The containment pressure peaks at about 75 psia, and at this point in time the amount of energy in the steam flowing into the deluge and quench tanks, plus the energy being retained in the saturated water in the containment, starts to exceed the coolant blow-down energy and the containment pressure reduces. By the end of the blow-down, approximately 27 seconds into the accident, the containment pressure has decreased to sub-atmospheric pressure, and at 32 seconds into the accident the containment has depressurized to about 9.5 psia.

During depressurization of the reactor coolant system from 2250 to 1900 psia at less than 0.2 seconds into the LOCA, an automatic closure of the isolation valves 148 and 149 at the steam line 146 and feedwater line 147 occurs. With the steam generator secondary isolated, the steam pressure increases at a result of continued energy flow, and thermal energy is transferred by thermal convection and conduction from the reactor system into the generator secondary system.

In less than 7 seconds the coolant blow-down depressurized the reactor system below that in the steam generator secondary, and the meantime, the secondary system pressure has increased above the normal 1000 psia range with the automatic closure of the isolation valve. Depressurization of the reactor coolant system below a generator secondary system pressure passively initiates emergency core cooling, i.e. emergency coolant flow into the reactor system from the refill tanks 114. The check valve 132 positioned in the series at the piping 131 interconnected the refill tanks to the reactor coolant system automatically open as soon as the reactor coolant system depressurizes below the hydrostatic pressure in the refill tanks. Safety injection flow from the refill tanks in turn automatically initiates steam flow from the steam generator 104 with open isolation valve 135 in the interconnecting steam line 128. Secondary steam flow through the injectors 129 within the refill tanks entrains the borated water providing rapid safety injection at a high-pressure into the reactor system. The emergency core cooling system designed is based on a core reflood rate equivalent to about 1.5 inches per second from a refill tank at 100 psia reactor coolant back pressure. This core reflood rate is adequate for the emergency cooling of the fuel elements.

The high turbulance resulting from reactor coolant blow-down increases the energy transfer from the fuel, and this continues with the rapid injection of emergency cooling water. With high borated refill water starting to refill the reactor vessel 102 and reflood the core within 7 seconds after the LOCA, the fuel is rapidly quenched preventing an excessive temperature increase.

The aforementioned describes the primary side decay heat removal system, which is now operational. The steam generators 104 secondaries contains an adequate amount of stored energy in the form of steam for safety injection, and refill tanks 114 have an adequate supply of borated water for core reflood and an overflow through the pipe break. Before the steam pressure in the steam generator secondary being utilized is expended the isolation valves 135 on the other steam lines 128 can be automatically or manually opened to continue the decay heat removal from the quenched fuel with the other standby refill systems in sequence.

After the refill systems in tanks 114 are expended, about four minutes into the accident, decay heat removal automatically continues with gravity flow of borated water from the four deluge tanks 116. The deluge tank water, heated from 50° F. to about 130° F. by steam carryover from the containment, has over 50 feet of static head. In that the containment free volume and the deluge tank free board are approximately at the same pressure, the driving force continuing decay heat removal is in excess of 20 psia. The stored coolant mass in the deluge tanks continues passive decay heat removal for about four hours into the accident. During this time, the containment 119 is flooded with borated water to an elevation above any postulated pipe break in the reactor coolant system.

After about four hours into the LOCA the passive engineered safety system inter-operations continue:

(a) The containment 119 is maintained below atmospheric pressure;
(b) Decay heat removal via gravity flow from the deluge tanks is becoming depleted; and,
(c) The containment free volume is flooded above the postulated pipe break location.

The temperature of the water flooding the containment is less than 200° F. and the free volume above flood level is below atmospheric pressure. The stored water in the quench tanks 118 continues to provide a heat sink for steam carry-over preventing the containment from being pressurized above atmospheric pressure. Within the four hour post-accident time period active systems can be made functional for continued decay heat removal.

Small Loss of Coolant Accident

In the spectrum of reactor coolant system pipe breaks, a small LOCA is one in which the charging pumps, i.e., the normally operating make-up pumps, are able to maintain an adequate supply of coolant in the reactor system for safe cooldown and cold shutdown. At the start of cooldown, the reactor and turbine are shut down. The secondary system of the steam generator is isolated by closing valves 148 and 149 on the generator main steam line and feedwater line 146 and 147, respectively.

After shut down, the reactor coolant system temperature is decreased at a rate of 50° F. per hour. For this cooldown, a secondary side-decay heat removal system becomes operational. The steam generator secondaries with closed isolation valves 135 on the steam lines 128 are used to tranfer heat from the reactor system to the associated quench tank 118. This secondary side-decay heat removal system utilizes the apparatus schematically illustrated in FIG. 11. Decay heat from the reactor core and sensible heat from the reactor system is transferred to the steam generator secondary by utilizing the reactor coolant pump 106, or by natural thermal convection. This heat, transferred to the secondary system, is in turn transferred to the quench tanks 118 by directed blow-down of steam through the relief valves 138 and pipes 151. Also, a portion of the steam blow-down may be directed through relief valve 138 associated with pipe 152 wherein make up steam injectors 145 inject emergency feedwater into the steam generator secondary through feedwater pipe 147.

During reactor cooldown, as soon as the reactor coolant system pressure decreases below 1000 psia, the refill system with open isolation valves 135 routed from the steam generator secondary to the refill tanks 114, is utilized for injecion of the reactor coolant makeup at a controlled rate, such steam generators being used for refill which were not used for secondary side decay heat removal.

The reactor vessel refill system, FIG. 10, and the secondary side-decay heat removal system of FIG. 11, are operative for the balance of the cooldown to cold shutdown. The steam from the steam generator secondaries transfers the decay heat to the quench tanks. The normally provided active residual heat removal system can be placed into operation at any time after the reactor coolant system pressure is reduced below 300 psia.

In the small LOCA, sump pumps and vacuum pumps, not shown, are effective in the removal of the coolant leaking into the containment 119. Cold traps in the vacuum system condense the leakage fluid carried over as a vapor that is condensed into the liquid in cold traps. The liquid collected is transferred to the radioactive liquid storage tanks, not shown.

Intermediate LOCA

An intermediate size LOCA results in a loss of coolant that is beyond the capacity of the charging pumps, and also, the reactor coolant system is not depressurized rapidly enough for the pressurized containment system refill system to become operative before the active high pressure injection system is automatically activated. In an intermediate size LOCA the active injection system is operative for that period of time required to depressurize the reactor coolant system below secondary system pressure. The passive refill system and the primary side-decay heat removal system of FIG. 10 are effective for the balance of the cooldown to cold shutdown.

Decompression of the reactor coolant through the pipe break results in the pressurization of the containment 119. Steam pressure within the containment forces the water in the vent pipes 139 and 139" to flow through submerged orifices into the free board space in the deluge and quench tanks. The containment peaks at a lower pressure than in the design basis LOCA because of the lower blow-down rate through the smaller pipe break.

After the secondary system energy is expended by the safety injection of the borated water from the refill tank 114, core decay heat removal automatically continues with gravity flow of borated water from the four deluge tanks. The containment 119 is flooded with the borated water to an elevation above any postulated intermediate pipe break in the reactor coolant system.

Steam Generator Tube Rupture

A postulated steam generator tube rupture is an intermediate sized LOCA. On a tube rupture, it is most desirable to cooldown the reactor to a cold shutdown condition as rapidly as possible. With the pressurized containment system disclosed a rapid cooldown is accomplished through secondary system steam relief to the deluge and quench tanks 116 and 118, respectively.

Reactor coolant blowdown through the tube rupture rapidly reduces the liquid mass and pressure in the reactor system, thus automatically actuating the charging pumps and the high-pressure injection pumps. Increased steam flow on the secondary side resulting from the tube rupture causes a steam flow/feed water flow mismatch tripping the turbine. Low pressurizer pressure actuates reactor trip, and the main steam generator steam line and feedwater isolation valve 148 and 149 close automatically.

The secondary side-decay heat removal system of FIG. 11 becomes operational. A termination of the main feed water flow automatically actuates relief valves 138 on steam line 146 at the steam generator secondary. Steam flow through the relief valve is directed to injector 145 at the quench tank 118. Chilled, demineralized water from the quench tanks is entrained by the steam flow through the injectors. The mixed fluid entering the steam generator secondaries through the feed water lines 147, and a portion of the secondary system steam blow-down is through relief valve 138, routed directed into the deluge and quench tanks through pipes 150 and 151.

During the reactor cooldown, the water in the steam generator with a faulty tube rises at a faster rate than the level in the other steam generators. The operator should terminate make up to the faulty steam generator in order to maintain as high a secondary pressure as possible, without opening the safety valves, to reduce continued reactor coolant blow-down through the rupture. The injected makeup flow from the quench tanks and steam blow-down to the deluge and quench tanks from the steam generators' secondary maintains the design rate of cooldown for the reactor coolant system.

It is noted that on a steam generator tube rupture the radioactive contamination resulting from reactor coolant blow-down from the faulted steam generator is restricted to the associated deluge and quench tanks 116 and 118.

After the reactor coolant system pressure is reduced below secondary system pressure, the reactor vessel refill system is operative along with the decay heat transfer system of FIG. 11 utilizing the heat sink capacities of the deluge and quench tanks. One or more steam generator secondaries are used for refill, and the other secondary systems are used for decay heat transfer.

Open Pressurizer Relief Valve

The passive containment system of the invention responds even more immediately to another intermediate LOCA, i.e., when a pressurizer relief valve doesn't reseat. The overpressure relief is quenched by the chilled water in a deluge tank such as through a pipe 139', and a deluge tank is not limited in heat sink capacity or free board for the mass carryover.

As in the case of a steam generator tube rupture, the high pressure injection pump maintain the required reactor coolant system inventory and reduce pressure until the passive refill system and the primary side-decay heat removal system of FIG. 10 is operative. One or more steam generator secondaries are utilized in the passive refill system, and the others are utilized for the secondary side-decay heat removal system of FIG. 11 to transfer the decay heat to the heat sink provided at the quench and deluge tanks.

Main Steam Or Feed Water Line Break

A break in the main steam line 146 of a generator causes a rapid increase in the steam rate flow from the affected steam generator 104 and a sudden reduction in its pressure and temperature. With the pressure in the affected steam generator reduced, backflow from the other steam lines through the break is prevented by self-actuated check valves, not shown. The high steam flow from the affected steam generator, coincident with low steam line pressure, signals the isolation valves 148 and 149 for each steam generator to close. Thus, the steam blow-down is practically limited to the affected steam generator 104. For a break outside the primary reactor containment, the closure of the steam line isolation valve 148 limits the blow-down to about ten seconds.

For a break inside of the primary reactor containment 119 the rapid blow-down increases the heat transfer rate, causing a sudden transient in the reactor coolant system significantly reducing the temperature, pressure, liquid volume and core shutdown margin. The transient automatically initiates an overpower reactor trip and actuates the safety injection system to prevent fuel damage. The borated water injected maintains sufficient coolant volume inventory and shut-down reactivity.

Assuming that the entire mass and energy from the affected steam generator carries over into the four deluge tanks 116 through the vertical vent pipes 139, the temperature of the stored water in the tanks increases from an initial 50° F. to about 65° F. This assumption on steam carryover into the deluge tanks is most conservative. It neglects the mass and energy that remains in the steam generator secondary. No credit is taken for mass and energy carryover into the four quench tanks 118. Also, a great portion of the mass and energy is retained within the primary reactor containment free volume.

A pressure transient occurs in the confines of the break location. The pressure peaks during vent pipe 139 clearance of water, and it is anticipated that this pressure transient does not exceed 25 psia. At the end of the blow-down the containment pressure is less than 5 psia.

In the post-accident time period the secondaries in the unaffected steam generators are available for the dissipation of core decay heat utilizing the secondary side-decay heat removal system apparatus shown in FIG. 11. This heat is transferred from the reactor coolant to the secondary system by natural convection and conduction. Steam blow-down from the secondary system through relief valves 138 is quenched by the water in the deluge and quench tanks 116 and 118. Steam flow is also directed through steam injectors 145 to provide emergency feedwater for continued decay heat transfer. The heat capacity of the deluge and refill tanks 116 and 114 enables cold shut-down of the reactor system without the need for the transfer of heat outside of the containment 119.

Thus, the passive containment system retains the mass and energy from a postulated spectrum of steam and feedwater line breaks. There is no release of mass, energy or radioactivity to the environment except for the ten second release of a steam line break outside of the primary reactor containment 119.

Loss Of External Electric Load Or Turbine Trip

A number of events resulting in a decrease in heat removal by the steam generator secondary systems are postulated. Beside (1) the loss of external electric load and (2) turbine trip, these events include; (3) steam pressure regulator malfunction or failure that results in decreasing steam flow, (4) inadvertent closure of main steam isolation valves, (5) loss of condenser vacuum, (6) coincident loss of onsite and external (offsite) a.c. power such as a station blackout, (7) loss of normal feed water flow, and (8) feedwater piping break. The alternate decay heat removal system is responsive in these events permitting safe reactor cooldown to a cold shut down condition.

On a loss of external electrical load the turbine is subject to being tripped. With a turbine trip the reactor is also subject to being tripped. A heat sink is required for the core decay heat to prevent overpressure in the secondary system of the steam generator as well as in the reactor coolant system. The secondary side-decay heat removal system shown in FIG. 11 provides this function.

The chilled water within the deluge and quench tanks 116 and 118, respectively, provide a heat sink for the core decay heat via the reactor coolant system and the secondary system. On reactor trip the steam generator relief valves 138 on the steam lines 146 are automatically actuated relieving secondary system steam into the deluge and quench tanks. The discharge from a number of relief valves is directed to steam injectors 147 that entrain water from the quench tanks 118 providing emergency feed water to the steam generators 104. At the reactor coolant system thermal circulation of the primary coolant transfers the decay heat from the core to the secondary system.

The response of the primary containment system of the invention to the above eight postulated events resulting in a decrease in heat removal by the secondary system is similar to that for a loss of normal feed water. Effectively, the core decay heat and the stored energy in the reactor coolant system and the secondary system are in the same range for the eight postulated events. Overpressure protection is also provided. The relief valve 136 and the safety valve 137 on the pressurizer 108 relieves any overpressure within the reactor coolant system by the discharge of these valves into the deluge tanks, the discharge conduits of the relief and safety valves communicating with steam vents of different deluge tanks whereby all four deluge tanks may be utilized in the absorption of thermal energy from the reactor coolant system through the pressurizer. Also, the safety valves on the steam lines 146 relieve overpressure in the steam generator secondaries to the quench tanks.

Loss Of Normal Feed Water

The passive containment system of the invention offers an alternate core decay heat removal system whenever the normal feed water sources are unavailable. This alternate system also enables reactor coolant system cooldown at 50° F. per hour. Emergency feedwater is automatically injected into the steam generator secondary systems from the quench tanks 118, along with steam blow-down to the contained heat sink, i.e. quench and deluge tanks. Decay heat is transferred by conduction and natural convection from the core elements to the secondary system for rejection from the reactor coolant system and the secondary side-decay heat removal system using the apparatus of FIG. 11 provides this function.

On a loss of normal feed water flow, relief valve 138 at two steam generators automatically open on high pressure or on the loss of feedwater. One set of valves initiates steam blowdown to the associated deluge and quench tanks, and valve 138 initiates steam flow through pipe 152 which activates injector 145 for forcing feedwater from the associated quench tanks 118 into the feedwater line 147.

Steam flow to the deluge and quench tanks absorbs the energy resulting from decay heat rejection, sensible energy flow (50° F. per hour) from the reactor coolant system cooldown, and secondary system temperature and pressure reduction. The latter enables continued thermal conduction and natural convection of energy from the reactor coolant system to the steam generator secondary systems. The initial mass flow of steam into the deluge and quench tanks is in the range of 80 pounds per second absorbing 95,000 BTUs per second. The steam is dissipated in the chilled water to the small orifices within vent pipes 139 and 139".

Steam flow to the injectors 145 positioned within the quench tanks 118 is used to replenish the mass lost through secondary systems steam blow-down and the added amount required for the change in the specific volume during steam generator cooldown. Steam flow through the injectors retains the chilled water, and develops a velocity head with sufficient resultant pressure to open the downstream check valves for emergency feedwater injection into the adjacent feed water lines. Initially, the high pressure steam entrains at least 1.24 pounds of water per pound of steam. The starting feedwater flow rate is in the range of 1000 pounds per second. As the secondary system pressure decreases, the economy of the injector improves. In this application the steam pressure and secondary system back pressure decrease simultaneously, and the temperature of the intake water increases as a result of the steam blow-down.

From the above description it will be appreciated that the passive containment system described above permits a wide variety of nuclear reactor accidents to be confined and controlled. The use of the refill, deluge and quench tanks in conjunction with the electrically operated isolation valves associated therewith, permits replacement reactor coolant to be directly introduced into the reactor coolant system, and the capacity of the deluge tanks permits the reactor to be flooded above the point of a break, in the event of a major LOCA. The deluge and quench tanks readily absorb the steam within the containment system during a major LOCA, and the design of the quench tank is such as to permit the necessary heat absorption over an extended period of time for lengthy heat decay purposes. Utilizing the secondary heat decay system employing the apparatus shown in FIG. 11 the deluge and quench tanks provide sufficient heat sink capacity to cool the steam generator secondary to achieve control of the reactor, and the quench tank injector provides a source for feedwater in those situations where additional feed water is needed for heat decay and control purposes. The presence of both deluge and quench tanks provides a versatility for heat sink purposes not heretofore available, and by controlling the utilization of steam energy within preselected steam generators the source of energy within the steam generators may be allocated between reactor coolant refill and heat decay functions as desired to most effectively bring the reactor assembly to a cooldown.

Various modifications to the inventive concepts may be apparent to those skilled in the art without departing from the spirit and scope of the invention.

For instance, the deluge and quench tanks of a common loop could be mounted in a common cell, one above the other, and other physical relationships could be modified from the disclosed embodiment within the concepts of the invention.

I claim:

1. A safeguard system for a nuclear reactor power plant having a reactor assembly with a reactor core including fuel therein, at least one steam generator, said steam generator having a first operative connection to said reactor assembly for the flow of a high-temperature high-pressure reactor coolant therethrough, said reactor coolant having a first pressure the magnitude of which is substantially constant during conditions of normal operation, and a closed primary containment structure sealingly enclosing said reactor and said steam generator, said safeguard system comprising, in combination, a refill reservoir of cooling liquid disposed generally internally of said containment structure, said cooling liquid being pressurized to a second predetermined pressure the magnitude of which during conditions of normal operation is less than the magnitude of said first pressure thereby defining a fist predetermined pressure differential, first conduit means for communicating between said cooling liquid and said reactor assembly, second conduit means for communicating between said steam generator and said cooling liquid, said first conduit means being effective to supply a flow of said cooling liquid to said reactor assembly whenever there is an accidental loss of said reactor coolant causing a reduction in the magnitude of said first pressure sufficient to attain a second predetermined pressure differential as between said cooling liquid and said reactor coolant within said reactor assembly, said second predetermined pressure differential causing flow of said cooling liquid to be directed to said reactor core, said flow of said cooling liquid being directed to said reactor core to thereby replenish said accidental loss of said reactor coolant, said second conduit means being effective when a third predetermined pressure differential is attained between said cooling liquid and the steam within said steam generator for supplying comparatively high-pressure steam to said cooling liquid to thereby provide a pumping force to said cooling liquid to completely fill that portion of the reactor assembly containing the fuel of said reactor core, a deluge reservoir of cooling liquid disposed entirely internally of said containment structure located at a vertical relationship above said reactor assembly creating a static pressure, said deluge reservoir having an upper region and a lower region first permanently open steam venting means within said deluge reservoir in communication with said containment structure at said upper region for directly receiving steam within said containment structure, first steam absorbing means within said deluge reservoir extending substantially throughout the depth of said reservoir and communicating with said venting means for absorbing steam from said venting means throughout said reservoir, a third conduit communicating with said deluge reservoir lower region and connected through valve means to said first conduit wherein the cooling liquid within said deluge reservoir may be selectively introduced into the reactor assembly for reactor core cooling purposes, a quench reservoir of cooling liquid disposed entirely internally of said containment structure, second steam venting means defined within said quench reservoir communicating with said containment structure wherein said quench reservoir is capable of receiving steam from within said containment structure, conduit means selectively connecting said quench reservoir to said steam generator for supplying emergency feed water thereto, second steam absorbing means within said quench reservoir extending substantially throughout the depth of said quench reservoir and communicating with said second venting means for absorbing steam from said second venting means throughout said quench reservoir a pressurizer in communication with said reactor coolant maintaining said reactor coolant first pressure, at least one relief valve communicating with a pressurizer opening when the pressure within said pressurizer exceeds a predetermined maximum pressure, said relief valve having a discharge communicating with said deluge reservoir wherein steam discharged through said relief valve passes into said deluge reservoir and it absorbed thereby, said steam absorbing means of said deluge and quench reservoirs comprising a plurality of conduits extending into said reservoirs each having a perforated axial portion through which vented steam is ejected, and a substantially vertically oriented shroud encompassing each of said perforated portions and in such radial spaced relationship thereto whereby said discharge through the perforated venting conduits is scrubbed externally due to thermal movement of the deluge and quench coolant within said reservoirs within said shrouds, said deluge and quench reservoirs being effective upon said containment structure being pressurized with steam due to accidental loss of reactor coolant to absorb the heat within said steam during and after accidental loss of reactor coolant for depressurizing said containment structure, said deluge reservoir steam absorbing means being constructed to effect immediate direct cooling of said reactor core, and said quench reservoir steam absorbing means being constructed to effect absorption of energy for the term of the accident and at a rate less than that of said deluge reservoir.

2. The method of effecting containment of a nuclear reactor power plant during accidental loss of reactor coolant wherein the reactor power plant includes a reactor assembly with a reactor core including fuel therein, at least one steam generator, said steam generator having a first operative connection to said reactor assembly for the flow of a high-temperature high-pressure reactor coolant therethrough, said reactor coolant having a first pressure magnitude of which is substantially constant during conditions of normal operation, and a closed primary containment structure sealingly enclosing said reactor and said steam generator, said safeguard system comprising, in combination, a refill reservoir of cooling liquid disposed generally internally of said containment structure, said cooling liquid being pressurized to a second predetermined pressure the magnitude of which during conditions of normal operation is less than the magnitude of said first pressure thereby defining a first predetermined pressure differential, first conduit means for communicating between said cooling liquid, and said reactor assembly, second conduit means for communicating between said steam generator and said cooling liquid, said first conduit means being effective to supply a flow of said cooling liquid to said reactor assembly whenever there is an accidental loss of said reactor coolant causing a reduction in the magnitude of said first pressure sufficient to attain a second predetermined pressure differential as between said cooling liquid and said reactor coolant within said reactor assembly, said second predetermined pressure differential causing flow of said cooling liquid to be directed to said reactor core, said flow of cooling liquid being directed to said reactor core to thereby replenish said accidental loss of said reactor coolant, said second conduit means being effective when a third predetermined pressure differential is attained between said cooling liquid and the steam within said steam generator for supplying comparatively high-pressure steam to said cooling liquid to thereby provide a pumping force to said cooling liquid to completely fill that portion of the reactor assembly containing the fuel of said reactor core, a deluge reservoir of cooling liquid disposed entirely internally of said containment structure located at a vertical relationship above said reactor assembly creating a static pressure, said deluge reservoir having an upper region and a lower region, first permanently open steam venting means within said deluge reservoir in communication with said containment structure at said upper region for directly receiving steam within said containment structure, first steam absorbing means within said deluge reservoir extending substantially throughout the depth of said reservoir and communicating with said venting means for absorbing steam from said venting means throughout said reservoir, a third conduit communicating with said deluge reservoir lower region and connected through valve means to said first conduit wherein the cooling liquid within said deluge reservoir may be selectively introduced into the reactor assembly for reactor core cooling purposes, a quench reservoir of cooling liquid disposed entirely internally of said containment structure, second steam venting means defined within said quench reservoir communicating with said containment structure wherein said quench reservoir is capable of receiving steam from within said containment structure, conduit means selectively connecting said quench reservoir to said steam generator for supplying emergency feed water thereto, second steam absorbing means within said quench reservoir extending substantially throughout the depth of said quench reservoir and communicating with said second venting means for absorbing steam from said second venting means throughout said quench reservoir, a pressurizer in communication with said reactor coolant maintaining said reactor coolant first pressure, at least one relief valve communicating with a pressurizer opening when the pressure within said pressurizer exceeds a predetermined maximum pressure, said relief valve having a discharge communicating with said deluge reservoir wherein steam discharged through said relief valve passes into said deluge reservoir and is absorbed thereby, said steam absorbing means of said deluge and quench reservoirs comprising a plurality of conduits extending into said reservoirs each having a perforated axial portion through which vented steam is ejected, and a substantially vertically oriented shroud encompassing each of said perforated portions in such radial spaced relationship thereto whereby said discharge through the perforated venting conduits is scrubbed externally due to thermal movement of the deluge and quench coolant within said reservoirs within said shrouds, said deluge and quench reservoirs being effective upon said containment structure being pressurized with steam due to accidental loss of reactor coolant to absorb the heat within said steam during and after accidental loss of reactor coolant for depressurizing said containment structure, said deluge reservoir steam absorbing means being constructed to effect immediate direct cooling of said reactor core, and said quench reservoir steam absorbing means being constructed to effect absorption of energy for the term of the accident and at a rate of less than that of said deluge reservoir, comprising the steps of venting the steam within the containment structure into cooling liquid within said deluge and quench reservoirs at said different heat absorption rates, and simultaneously absorbing energy from the containment structure in said reservoirs during the accidental loss of said reactor coolant over a duration related to the rate of heat absorption.

* * * * *